July 28, 1959          H. C. MILLER          2,896,477

METHOD OF MOUNTING DIAMONDS IN TOOL SHANKS AND OTHER HOLDERS

Filed July 2, 1957          4 Sheets—Sheet 1

INVENTOR
HAROLD C. MILLER
by Fred Gerlach
ATTY.

July 28, 1959   H. C. MILLER   2,896,477
METHOD OF MOUNTING DIAMONDS IN TOOL SHANKS AND OTHER HOLDERS
Filed July 2, 1957   4 Sheets-Sheet 2
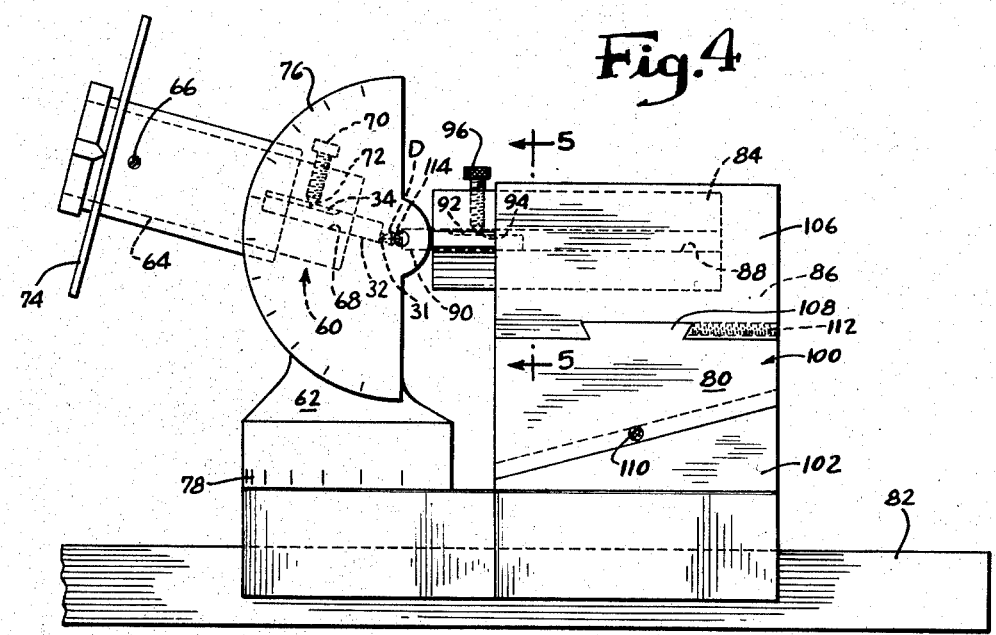
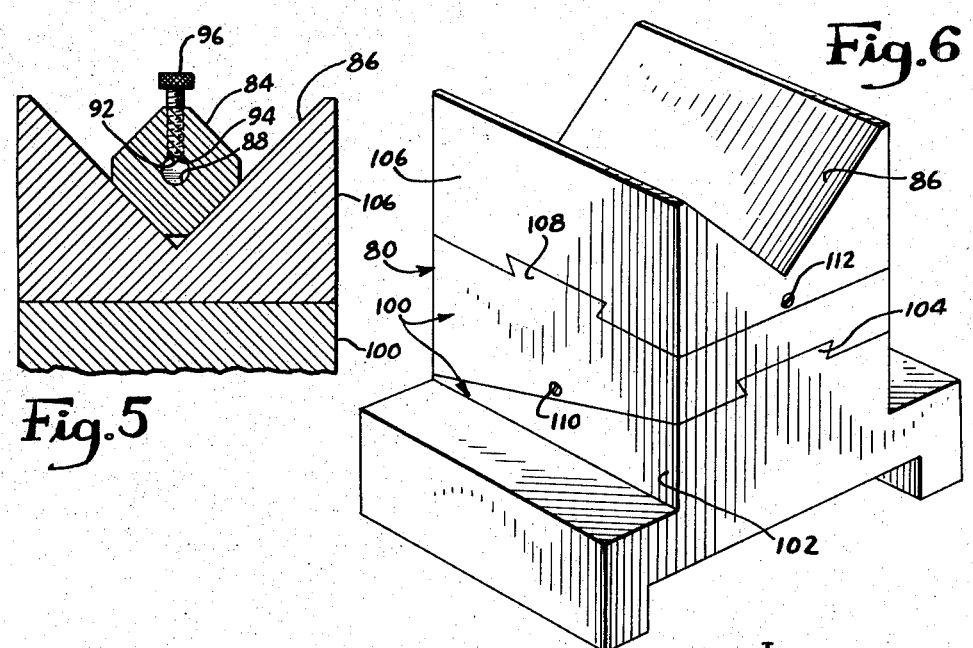
INVENTOR
HAROLD C. MILLER
by: Fred Gerlach
ATTY.

July 28, 1959  H. C. MILLER  2,896,477
METHOD OF MOUNTING DIAMONDS IN TOOL SHANKS AND OTHER HOLDERS
Filed July 2, 1957  4 Sheets-Sheet 3
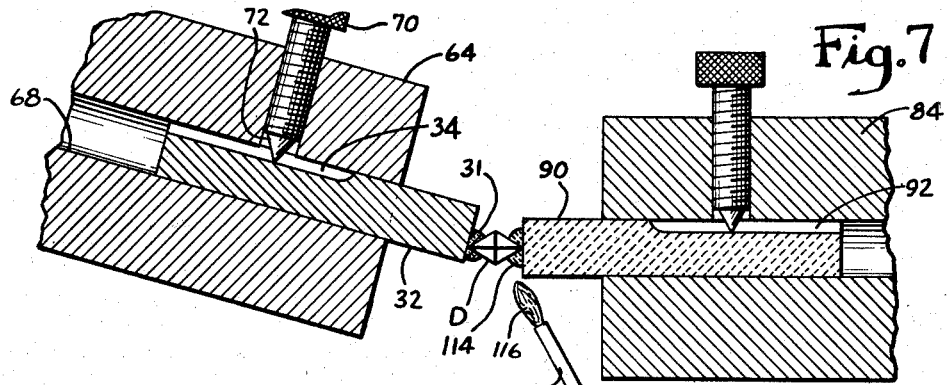
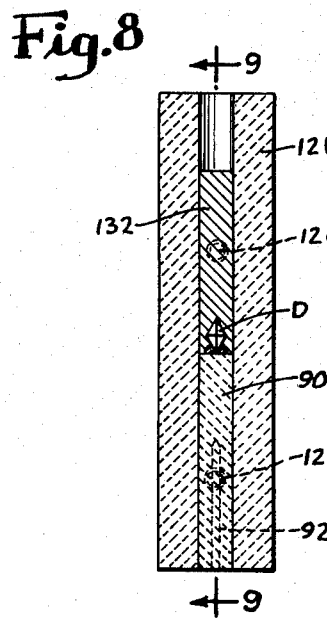
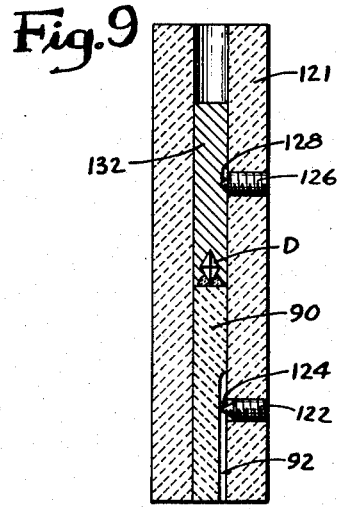
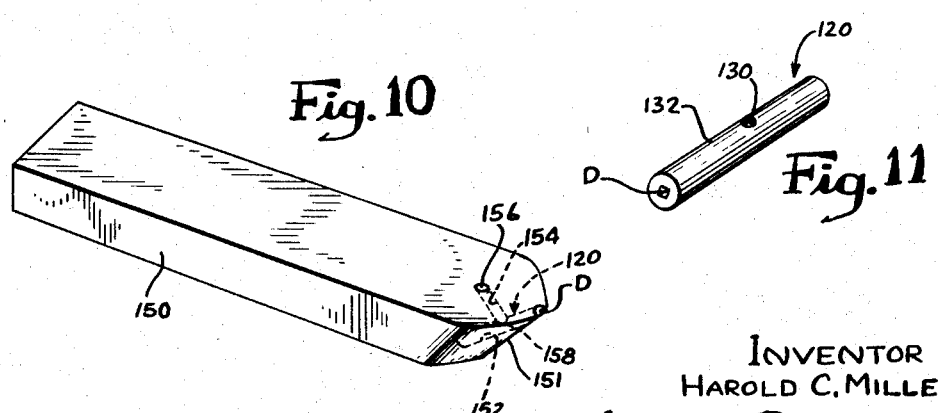
INVENTOR
HAROLD C. MILLER
by: Fred Gerlach
ATTY.

July 28, 1959 H. C. MILLER 2,896,477
METHOD OF MOUNTING DIAMONDS IN TOOL SHANKS AND OTHER HOLDERS
Filed July 2, 1957 4 Sheets-Sheet 4

INVENTOR
HAROLD C. MILLER
by: Fred Gerlach
ATTY.

United States Patent Office 2,896,477
Patented July 28, 1959

2,896,477

METHOD OF MOUNTING DIAMONDS IN TOOL SHANKS AND OTHER HOLDERS

Harold C. Miller, Chicago, Ill., assignor to Super-Cut, Inc., Chicago, Ill., a corporation of Illinois Application July 2, 1957, Serial No. 669,492

12 Claims. (Cl. 76—101)

The present invention relates to a method of and an apparatus for mounting diamonds in tool shanks by means of which the diamond may be caused to do useful work, or in a suitable holder by means of which work may be performed on the diamond, as for example in the sawing, cutting, lapping, polishing or otherwise shaping the diamond. More specifically, the invention is concerned with a novel method and apparatus whereby a diamond may be thus mounted in a tool shank or holder with the diamond being precisely oriented with reference to its crystallographic axes and the axis of the shank or holder in order that improved performance, either of the work performed by the diamond or the work performed upon the diamond, may be attained.

It has long been recognized that a diamond offers varying resistance to abrasion, depending upon the particular relationship between the direction of abrasion across the contacting face of the stone and the crystallographic axes of the stone. For example, utilizing the system of crystallographic notation known as Miller's indices, as described in a publication entitled Mineralogy, by Kraus, Hunt and Ramsdell, published by McGraw Hill Book Company of New York, fourth edition (1951) pages 15 and 16, a diamond is possessed of three major basic families of planes existing throughout the crystal structure. These are the cube or (100) planes, the octahedron or (111) planes, and the dodecahedron or (110) planes. These indices afford a convenient system of notation for specifying orientation of a diamond without reference to its position in space and they are based upon the intercepts of a plane with the three crystal axes of the diamond.

In the cube plane, a diamond offers a relatively lower resistance to abrasion when it is being abraded in a direction parallel to a crystallographic axis, i.e., parallel to a cube edge. It offers appreciably greater resistance to abrasion when it is being abraded from point to point on the plane, i.e., in either diagonal direction across the cube face. Within the cube plane, the magnitude of abrasive resistance varies vectorially between these two directions, the increments of abrasive resistance increasing as the direction changes from parallelism with a crystallographic axis to a 45° angle with respect thereto in the plane.

Within the octahedron plane, the resistance to abrasion offered by a diamond is greater in any direction than the resistance which is offered in the cube plane or dodecahedron plane. An octahedron face exhibits itself on the surface of a diamond as an equilateral triangle and such faces and planes offer directional resistance to abrasion in that when abrasion takes place in the plane in a direction extending from a base to a point the resistance to such abrasion is greater than when the abrasion in the plane extends from the point to the base.

Within the dodecahedron plane, there are wide vectorial variations in resistance to abrasion. As will be more readily perceived when exhibited as a rhombric face, the dodecahedron plane cuts two of the crystallographic axes but extends parallel to the third axis. Extending across two opposed corners of the rhombus in a direction at right angles to the unintersected crystallographic axis which may be referred to as the (110) direction, the resistance to abrasion is relatively high. At right angles to this direction, the resistance to abrasion is considerably lower. In this (110) direction, within the dodecahedron plane, the resistance to abrasion is slightly less than it is in the (111) or octahedron plane.

Of equal importance is the cleavage of the diamond, there being a family of cleavage planes parallel to the octahedron or (111) faces of the stone. Fracture readily takes place along these planes and it is important that they be oriented relative to the direction of force applied to the stone when the latter is performing useful work.

It is obvious, in view of the above phenomena, that where a diamond is to perform useful work, for example, in dressing the peripheral or other surface of a grinding wheel or the like, or where a diamond is to be worked upon, for example, where it is to be sawed into individual slabs or shaped, it is highly advantageous that the diamond be mounted in the tool shank or holder with its crystallographic axes so disposed relative to the axis of the tool shank, or relative to the axis of the holder, as the case may be, so that on the one hand where the tool shank is concerned, normal feeding of the shank as a preliminary to the usual traversing operations will bring the stone into traversing register with the surface undergoing dressing so that abrasion will take place in a direction wherein the diamond is highly resistant to abrasion and cleavage, and so that on the other hand where the holder is concerned and the diamond is to be worked upon, the diamond will be held so that abrasion will take place in a direction wherein the diamond is readily susceptible to abrasion.

In a co-pending application of Leopold H. Metzger and myself, Serial No. 664,570, filed on June 10, 1957, for "Method of and Apparatus for Dressing Grinding Wheels," it has been set forth that the efficiency of a diamond dressing stone is greatest when the stone is presented to the work in such a manner that abrasion takes place either in the (110) direction of the dodecahedron plane or parallel to the (110) direction. This application further discloses a diamond which has been mounted in a tool shank at the forward end thereof with the diamond being so oriented, crystallographically speaking, that its (110) direction extends at a predetermined or designed angle to the axis of the tool shank so that upon normal feeding operations between the shank and the work, optimum dressing with a minimum of wear on the diamond will take place. Reference may be had to the above mentioned application for a full disclosure of the theoretical considerations associated with such mounting of a diamond in a shank for dressing purposes, but, for purposes of disclosure of the present invention, it is deemed sufficient to state that the method and apparatus thereof is concerned with a novel means whereby a diamond may be mounted in a shank for turning, boring, dressing or other purposes in the predetermined manner of crystallographic orientation set forth in the above mentioned application, or in any other manner of crystallographic orientation which may be deemed appropriate for the purposes at hand, with reasonable assurance that in each instance, after the steps of the present method have been properly carried out, the diamond will have been placed in position on the shank and properly set therein with precise orientation within limits which are so fine as to be reliably unattainable by present day methods of mounting a diamond which involve direct visual observation of the stone, sensory coordination, and manual dexterity. Where it is desired that a diamond shall be mounted in a holder such as a saw dop or the like for sawing, or where the diamond is to be permanently mounted in a slug for subsequent shaping, polishing, lapping or other operations to be performed on the diamond, utilizing conventional casting, hot pressing or other methods, the present invention provides a method of mounting the diamond in the holder in such a manner that its crystallographic orientation relative to fixed fiducial reference indicia on the holder will, with reasonable assurance and within similarly fine limits, be known so that the holder may be applied to the diamond shaping saw or other tool for most effective shaping operations.

Present day methods of mounting a diamond in a shank or holder are as varied as are the talents of the operators who practice them and, invariably, they are dependent upon a high degree of skill which can be attained only by long experience and upon rare judgement in visually interpreting the indications which may be found on the surface or within the internal structure of a diamond. Even when a particular stone does prevent visible indications of its crystallographic structure, the proper interpretation of these indications and the techniques involved in handling the diamond during mounting operations leave much to chance so that when the diamond is finally mounted, orientation within solid angles of 15° with respect to the three crystallographic axes of the stone is all that can be expected. It is not within the scope of the present application to outline all of the various techniques involved in present day diamond mounting operations, but it is deemed pertinent to outline at least one of the more common procedures.

Selection of a diamond for shape, size, quality and for freedom from flaws toward the aims which the artisan has in mind is of prime importance since the more appropriate the shape, the less work is required. Having selected a stone of appropriate shape, and holding the stone in a pair of tweezers or the like, the operator will examine the stone carefully through a loop or microscope and take cognizance of surface striations, apparent crystallographic formation, the presence of growth pits, surface striations, or other clues which will give him an indication of the direction of the three crystallographic axes of the stone. If such indications are to be found, the operator will then trace appropriate guide lines on the surface of the stone in India ink and these guide lines will constitute his sole reference for further mounting operations such as the mounting thereof on a working dop. To compensate for possible errors of a cumulative nature which may have accrued during the various handling techniques involved in the mounting of the stone on the shank or other holder to which the stone has been applied, it is frequently necessary to mill or otherwise shape the shank or holder with the fixed stone therein and for these shaping operations the operator will have as a guide only the reference marks created on the surface of the stone by himself in the first place.

The above outline procedure requires that the tool maker select for mounting purposes stones which have an appropriate shape, considering the use to which the stone is to be put, regardless of how this shape is imposed over the crystallographic structure of the stone. This initial selection of the stone calls for the use of more costly diamonds and it also eliminates from the available stones, many which otherwise would be appropriate for use. Apart from considerations of initial stone selection, the procedure is, at best, an uncertain one insofar as results are concerned in that the operations involved are, in the main, ones where the stone is directly handled and brought to its final anchored position in the holder by manipulations which are conducted by the tool maker on the basis of his initial observations and stone markings but wherein the diamond may be inadvertently moved during its setting that its final orientation is not in accord with the desired orientation. Furthermore, by such a procedure there is no certainty that during stone preparation preparatory to mounting, as well as during use of the stone when finally mounted, full use of the hardness or other physical properties of the diamond will be made.

The present invention is designed to overcome the above noted limitation that are attendant upon present day mounting of diamonds in tool shanks and various other types of holders and, toward this end, broadly, it involves a novel method of accurately mounting a diamond in any desired position of orientation thereof with respect to a holder wherein the number of diamonds available for use from any given parcel of diamonds is materially increased; the skilled handling of the diamond for placement purposes at any stage in the process is completely eliminated; the only observation of the diamond per se required throughout the entire mounting process is an initial examination of the stone for quality and size and its placement in an approximate position of desired orientation on a temporary holder from which it is ultimately transferred to the finished mount; the deviation of the approximately oriented diamond from its desired orientation is ascertained by X-ray diffraction procedure; orientation of the temporary holder and its affixed diamond relative to a second holder is effected on the basis of such ascertained deviation or any desired modification thereof; and mechanical transfer of the diamond to such second holder is effected while maintaining the two holders thus relatively oriented, together with the performance of any desired further mechanical transfer of the diamond from the second holder to a final mount as well as positioning of the mount in an operating shank or other holder while automatically preserving the corrected orientation of the stone by certain fiducial alignment procedure whereby the finally mounted diamond will have the desired crystallographic orientation in the final mount.

The provision of a method of mounting a diamond in the manner briefly outlined above being among the principal objects of the invention, numerous other objects and advantages thereof will become readily apparent as the following description ensues.

In the accompanying four sheets of drawings forming a part of this application, a disclosure of some of the equipment employed in practicing the present method has schematically been illustrated.

In these drawings:

Fig. 4 is a side elevational view, schematic in its representation of a goniometer-type correction and transfer apparatus employed in connection with the invention;

Fig. 5 is a sectional view taken substantially along the line 5—5 of Fig. 4;

Fig. 6 is a fragmentary perspective view of a transfer fixture employed in connection with the present method;

Fig. 7 is an enlarged fragmentary side elevational view of certain transfer mechanism schematically illustrating a transfer operation wherein the stone undergoing mounting is removed from one retaining element and applied to another retaining element in a transfer zone;

Fig. 8 is a longitudinal vertical sectional view taken substantially centrally through a casting mold utilized in the present process;

Fig. 9 is a sectional view taken substantially along the line 9—9 of Fig. 8;

Fig. 10 is a perspective view of a diamond-carrying slug formed by the casting mold of Figs. 6 and 7;

Fig. 11 is a perspective view showing the diamond-carrying slug of Fig. 10 operatively mounted in a tool shank.

Figure 1:
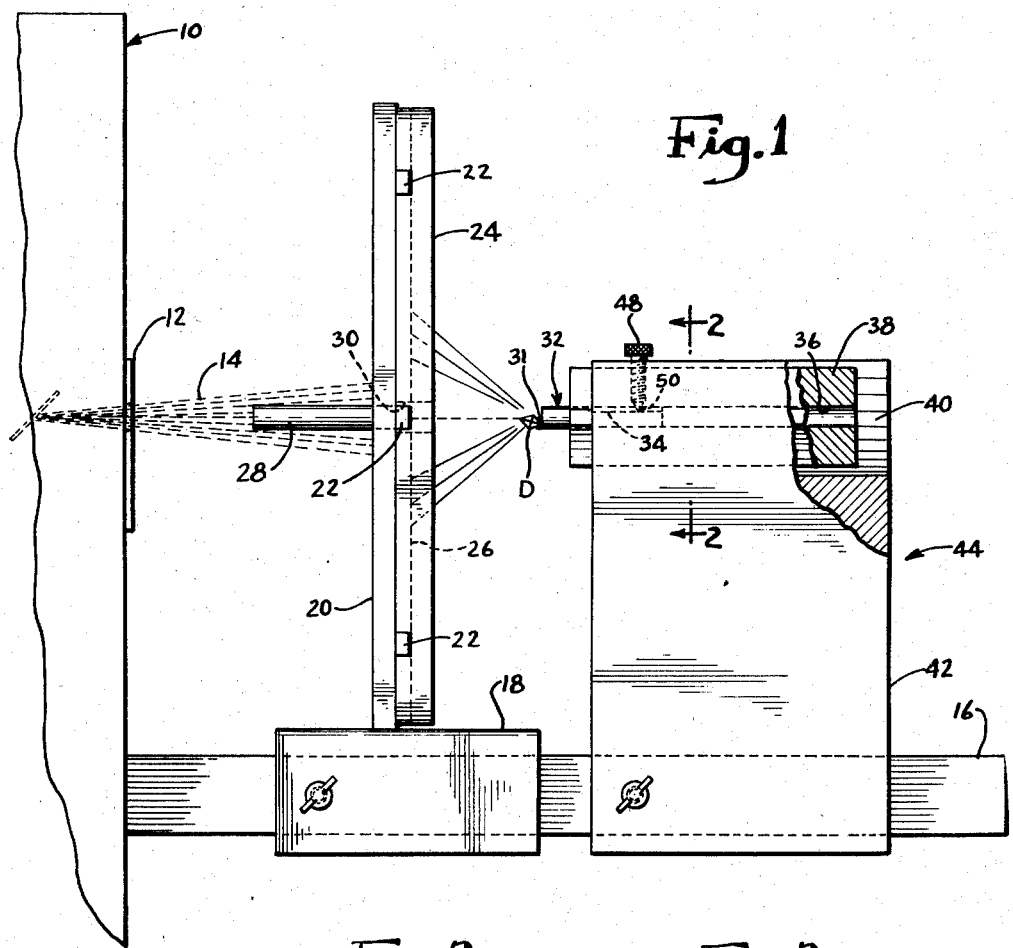
Fig. 1 is a side elevational view, schematic in its representation of an X-ray diffraction instrument and its associated diamond target-supporting fixture employed in connection with the present invention.

The principles of the present method are applicable to, and have been illustrated herein in connection with, the selection of a diamond from a parcel of diamonds and the incorporation of the selected diamond in a tool shank with a precise degree of orientation to produce what is known in the art as a diamond tool. The method may, if necessary, involve the shaping and working of a diamond to impart to it a desired contour prior to or after its incorporation in the tool shank.

Briefly, these principles are attained by selecting a stone for size, quality and approximate shape, bearing in mind, of course, the particular use to which the stone is eventually to be put. The selected stone is then mounted on one end of a temporary dop with its working end exposed, the mounting being made after an examination of the stone and in such a manner that the stone, when mounted on the temporary dop, will roughly approximate in orientation the position which it subsequently will assume in the tool shank at the completion of mounting operations. The temporary dop may be formed of brass and it is preformed with a fiducial indicia by means of which it may be accurately positioned in a fixture having counterpart fiducial indicia with the working end of the stone in register with the collimator tube of a conventional diffraction X-ray apparatus. The term "fiducial" as employed herein is substantially synonymous with the term "reference" and, as used herein, a fiducial indicia comprises a fixed mark, line, point or other visible or functional reference from which measurements may be made. The dop and its contained stone is applied to the fixture and brought into such register with the collimator tube and an exposure is effected so that the developed film will give an accurate indication of the crystallographic orientation of the diamond relative to the fiducial indicia and the longitudinal and transverse axes of the dop. The X-ray diffraction pattern thus obtained on the film is superimposed on a Greninger chart and the deviation of the three crystallographic axes of the stone, as mounted on the dop, from the fiducial axes of the chart is carefully noted. The temporary dop and its mounted diamond is then transferred to a second fixture associated with a tri-axial goniometer type correction and transfer apparatus of novel design, this latter fixture having fiducial indicia designed for cooperation with the fiducial indicia on the temporary dop. The goniometer fixture is in the form of an angle positioning device which moves bodily with the output element of the goniometer proper and when the fiducial references on the goniometer fixture and the temporary dop are in register and the goniometer adjusted so that its three scales are each set at a zero reading, the diamond carried on the outer end of the temporary dop mounted in the goniometer fixture will assume a position with reference to the zero axes of the goniometer that it assumed with reference to the collimator tube of the X-ray diffraction apparatus at the time the X-ray exposure was made, the angles of deviation of the three crystallographic axes of the stone from the zero axes of the goniometer being, respectively, the deviation angles noted during comparison of the diffraction pattern with the Greninger chart as outlined above.

If it is desired that the stone shall be finally mounted in the completed tool with the three crystallographic axes thereof in coincidence with the longitudinal and transverse axes of the tool, the goniometer instrument will be adjusted in such a manner that the three noted angles of deviation will be set into the instrument as correction factors and the goniometer fixture will thus be brought to a position wherein the stone carried on the temporary dop, accurately referenced relative to the fixture, will assume a position wherein its three crystallographic axes coincide with the zero axes of the goniometer instrument. If, on the other hand, it is desired that the stone shall assume a position in the diamond tool with its crystallographic axes bearing a predetermined relation relative to the longitudinal and transverse axes of the tool, the necessary precalculated correction factors are, at this time, superimposed on the chart-obtained correction angles and the resultant values set into the goniometer instrument so that the stone will assume a position relative to the zero axes of the instrument wherein its crystallographic axes deviate therefrom by angular displacements which are commensurate with the desired deviation angles in the final mount. The diamond is then accurately positioned for transfer to a second or transfer dop which, if no shaping or sawing operations are to be performed on the stone, may be in the form of a casting dop and which, if such shaping operations are to be performed, may be in the form of a saw dop or similar holder.

The second dop may be formed of graphite or a suitable refractory material and, to effect the transfer operation, this dop is mounted in a third fixture positioned adjacent the goniometer fixture and capable of linear movement bodily toward and away from the latter. The refractory dop and third fixture are provided with cooperating reference indicia and these indicia are such that the longitudinal and transverse axes of the refractory dop will at all times extend parallel to the three zero reference axes of the goniometer instrument during axial movement of the fixture toward and away from the adjusted goniometer fixture.

According to the present method, novel manual means are employed for effecting a transfer of the stone from one end of the temporary dop positioned in the goniometer fixture to the adjacent end of the refractory dop in the third fixture when the latter fixture is brought into close proximity to the former fixture and, because of the axial parallelity which is maintained as set forth above, the stone when transferred to the refractory dop, will assume a position thereon wherein the displacement angles of the crystallographic axes of the stone are preserved in the second dop after transfer thereto. Such preservation of the displacement angles is made possible by the disposition of the cooperating reference indicia on the refractory dop and third fixture, the dop indicia constituting a carrying forward, so to speak, of the same fiducial reference applied to the initial temporary dop.

The transfer operation involves a simultaneous release of the stone from the temporary dop and an affixation thereof to the refractory dop and, when the transfer has been effected, the refractory dop may be mounted in the clamping holder of a diamond saw or other shaping tool and sawing or other shaping operations performed on the stone. Because of the known relationship between the crystallographic axes of the stone to the fiducial reference on the refractory dop, the diamond may be applied to the saw blade precisely oriented for the most effective sawing operations.

The refractory dop with the diamond carried thereby may be utilized in a casting or equivalent operation whereby the diamond is transferred to a suitable slug, mount or metal holder which constitutes the final diamond tool. If the casting technique is used, the refractory dop is removed from the transfer fixture and the dop is inserted into a mold cavity having suitable reference indica for affixing the dop in the cavity in a predetermined relationship whereby a fiducial reference indicia may be applied to the cast slug prior to its removal from the mold cavity. Casting operations are then effected by casting molten metal, by pressing powdered metals, by heat pressing powdered metals, by infiltration of molten metal into powdered metal, or by any process capable of permanently attaching the diamond to a holder so that the diamond will have its useful end exposed with the crystallographic axes precisely oriented relative to the longitudinal and transverse axes of the slug and the fiducial indicia thereon and displaced therefrom by the desired deviation angles obtained on the basis of the X-ray film and chart comparison procedure outlined above. The slug, thus obtained from the casting or other mounting operation is adaptable for use in a large number of diamond-working or shaping machines and the slug may be shaped, if necessary, to fit standard collets associated with such machines or the collets may be designed to fit the slug. In each instance, fiducial reference indicia will be provided on the collet or other holder to preserve the desired deviation angles. The slug may also be mounted in a prefinished tool shank in a hole or socket which may be drilled into the shank at any desired angle and which may be calculated according to engineering exigencies to give the desired orientation to the diamond when the slug is mounted in the shank. The slug may be permanently anchored in the drilled hole in a predetermined position utilizing fiducial reference indicia to attain the desired position. In certain instances, the anchoring may be performed by a soldering operation so that reshaping or redressing of the tool may be resorted to when necessary by the simple expedient of melting the solder, removing the tool, effecting reshaping operations on the tool and replacing the tool in the shank in its originally installed position.

Figure 2:
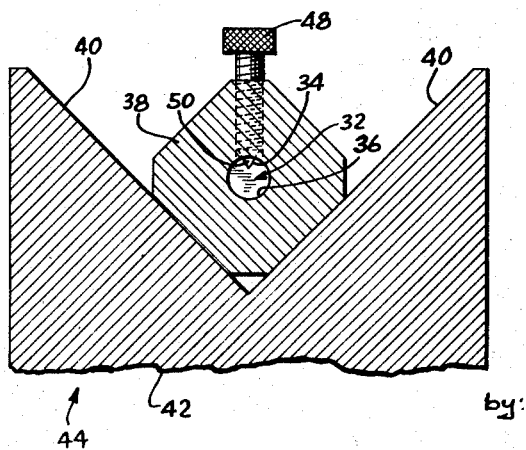
Fig. 2 is a sectional view taken substantially along the line 2—2 of Fig. 1.

Referring now to the drawings in detail wherein one form of apparatus for carrying out the present method has been illustrated by a more or less schematic representation, the X-ray diffraction apparatus and its associated fixture by means of which the approximately positioned diamond on the temporary dop is brought into register with the collimator for exposure purposes is shown in Figs. 1 and 2. A fragmentary portion of the X-ray machine is designated in its entirety at 10, the X-rays issuing from the X-ray tube 12 thereof being shown at 14. Extending forwardly from the machine 12 adjacent the base thereof is a guide rail 16 on which there is slidably mounted the base portion 18 of a film holder supporting frame 20 which extends upwardly from the base portion 18 and has mounted on the side members thereof a plurality of spring retaining clips 22 and between which clips there is removably mounted a film holder or cassette 24. The cassette 24 is of conventional design and is in the form of a light-tight container in which the film 26, together with an intensifying screen or screens (not shown) if the use of such screens is desired, is enclosed. The frame 20 serves to support the X-ray collimator tube 28 and the forward end of the latter is in register with a central opening 30 provided in the film 26 (see also Fig. 9). The cassette 24 is mounted in front of the X-ray tube 12 to receive Laue back reflection patterns issuing from the initially selected diamond D, the crystallographic pattern of which is to be recorded on the film 26.

Figure 3:
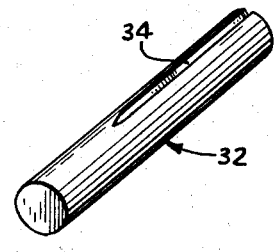
Fig. 3 is a perspective view of a temporary diamond-supporting dop employed in connection with the invention.
Figure 12:
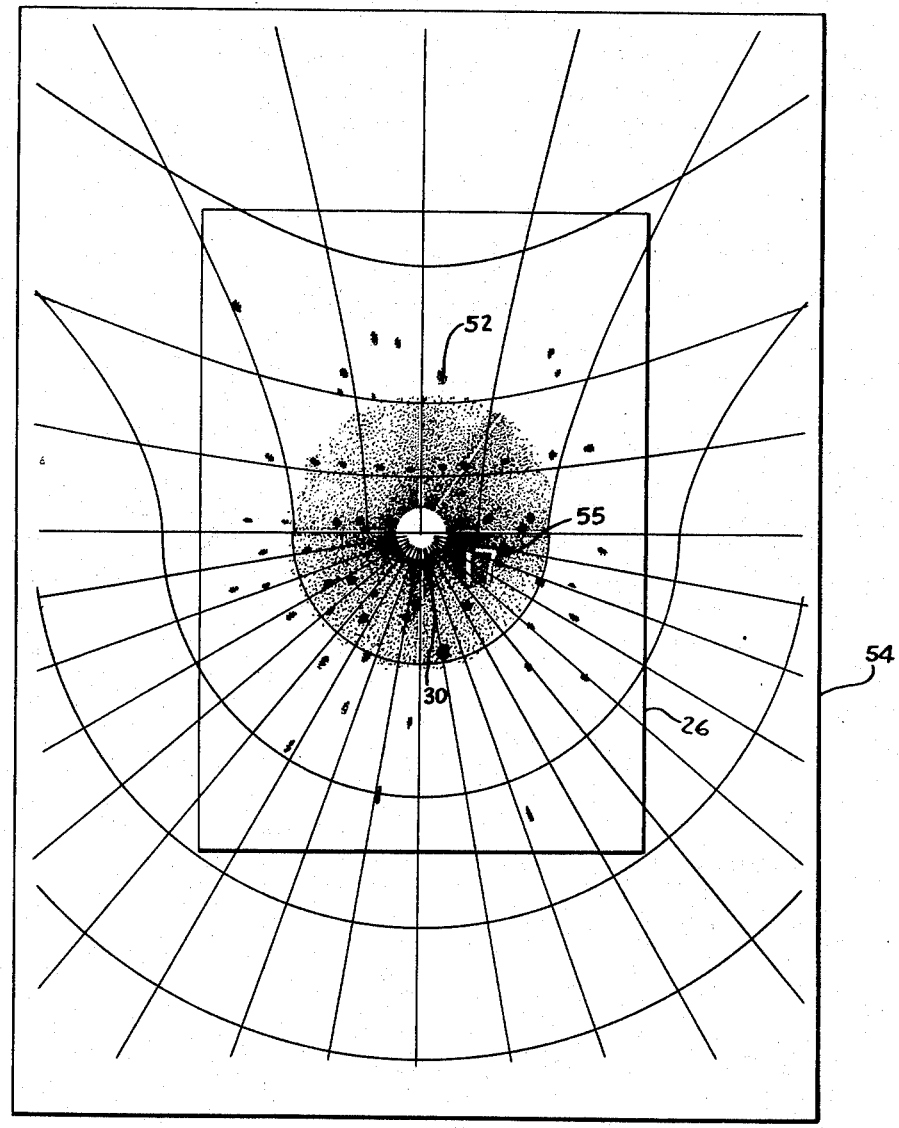
Fig. 12 is a Greninger chart diagram showing a back reflection X-ray film superimposed thereover for reading purposes according to the present invention.

The diamond D, after initial selection from a parcel of diamonds as previously described, is affixed to one end of a temporary dop 32 by means of a daub 31 of orange shellac or similar adhesive and which, after hardening, is susceptible to melting upon the application thereto of heat under the influence of a relatively low flame. The dop 32 is preferably in the form of a solid cylindrical body (Fig. 3) in which there has been formed an elongated, longitudinally extending V-shaped groove or flute 34 of appreciable extent. The dop 32 is mounted in a longitudinally extending bore 36 provided in a block 38 loosely supported in a V-rest 40 provided adjacent the upper end of a fixture block 42 forming a part of a fixture assembly designated in its entirety at 44. The fixture block 42 is slidable on the rail 16 and is adapted to be secured in any position of longitudinal adjustment thereon by means of a set screw 46. The dop 32 is maintained in the bore 36 in a predetermined position by means of an anchoring screw 48 threadedly received in the block 38 and having a conical end 50 in mating engagement with the flute 34. The flute 34 establishes a fiducial reference for the dop 32 as a whole, as well as for the diamond mounted thereon, and the initial application of the diamond D to the end of the dop is made roughly by eye so that the diamond is applied to the dop with its working end extending forwardly away from the end of the dop with the stone assuming roughly the position it will assume in use. No special care need be taken in thus applying the stone to the end of the dop 32 other than to insure a firm temporary bond when the shellac or other adhesive had hardened. This approximate orientation of the diamond on the dop 32 is made, of course, with reference to the longitudinal axis of the dop and to the fiducial flute 34.

The fixture 44 is adjusted so that the diamond D will lie on the axis of the collimator tube 28 on the side of the film 26 opposite the X-ray tube 12 and at the proper distance wherein back reflection patterns will be approximately directed to the film. The axis of the dop 32 and the axis of the collimator tube 28 will coincide as shown in Fig. 1. With the diamond thus mounted, the X-ray exposure is made for the requisite period of time and, upon processing of the film 16 in the usual manner of processing, a diffraction pattern fiducially references with respect to certain radiographic axes obtained from engraving the cassette will be obtained. An exemplary pattern from which the directions of the crystallographic axes of the X-rayed diamond D may be obtained is shown in Fig. 9. The arrangement of the dark spots designated at 52 on the pattern illustrated in Fig. 9 may be interpreted so that they will render a record of the direction of the crystallographic axes of the stone as related to the axis of the dop 32 and the fiducial flute 34 and the ascertained directions of the three axes may be compared with the fiducial axes of the dop 32 by application of the film 26 to a Greninger chart such as has been shown at 54 in Fig. 9 with the chart and film superimposed. Upon such superimposition of the film and chart, the three angles of deviation may be measured.

It is to be noted at this point that the reference marking designated at 55 of the film 26 is an identifying numeral by means of which the particular film may be properly identified with the corresponding dop 32 and its contained diamond. Thus, where a large number of diamonds are undergoing mounting, the separately referenced films and the diamonds which they respectively represent may readily be correlated with a minimum of confusion as will be pointed out subsequently. It may also be noted that for rapid mounting operations, the film 26 may be analyzed with reference to the Greninger chart while the film is in its wet state, thus materially reducing the time required to effect final mounting of the diamond D. An additional time saving feature of the present method resides in the spring clip mounting for the cassette 24 which enables rapid-succession exposure of a number of films which have been serially numbered to correspond with the numbering of corresponding dops so that the films may be developed simultaneously after selection of a day's quota of diamonds to be mounted, for example, in normal shop procedure according to the present invention.

Referring now to Figs. 4, 5 and 6, after the X-ray exposure has been made, the temporary dop 32 with the approximately oriented diamond D thereon is removed from the fixture 44 and mounted in a fixture 60 associated with a triaxial goniometer instrument 62 of modified design, the fixture being in the form of a block which is telescopically received within a surrounding sleeve 64 which constitutes the movable output element of the instrument and which is secured in the sleeve 64 by means of a set screw 66 in any desired position of longitudinal adjustment relative to the sleeve. The block 60 is formed with a central bore 68 therein in which the dop 32 is telescopically received and in which it is secured by means of an anchoring screw 70 having a conical inner end 72 designed for registry with the fiducial flute 34 provided in the dop 32.

The instrument 62 is provided with a scale 74 for indicating the components of angular rotation of the fixture about the longitudinal axis of the instrument, a scale 76 for indicating the components of angular rotation of the fixture about the transverse horizontal axis of the instrument, and a scale 78 for indicating the components of angular rotation of the fixture about the vertical axis of the instrument. The deviation of the fixture at any given setting of the goniometer instrument from the three goniometer reference axes described above are commonly known as the Alpha (A), Beta (B) and Phi ($\phi$) angles or deviations and the scales which indicate such deviations are similarly designated. In practicing the present method, ordinarily the position of the block or fixture 60 will be adjusted in the sleeve 64 and the dop 32 adjusted in the block 60 so that the diamond assumes a central position at the intersection of the three axes of the goniometer instrument 62, i.e., at the focal observation point of the goniometer system.

As previously stated, the three angles of crystal axis deviation of the approximately positioned diamond D on the temporary dop 32 may be ascertained by the observer by film comparison with the chart 54 and, for convenience of description herein, these deviation angles may likewise be referred to as the (A'), (B') and ($\phi'$) deviation angles. From the above description it will be apparent that the diamond D which is affixed to the end of the temporary dop 32 is a roughly oriented position thereon will, when the goniometer instrument is set for a zero reading of all three scales, i.e., the (A), (B) and ($\phi$) scales, have its crystallographic axes displaced from the three reference axes of the goniometer by angles the magnitude of which are equal to the magnitude of the (A'), (B') and ($\phi'$) angles respectively. Now, if it is desired that the diamond D be oriented in its final mount or slug with its crystallographic axes parallel to the fiducial axes of such holder which are established by certain fiducial reference indicia on such slug as will be described subsequently, goniometer instrument 62 will be adjusted so that the (A), (B) and ($\phi$) scales 74, 76 and 78, respectively, will indicate the magnitudes of the three deviation angles (A'), (B') and ($\phi'$) respectively. If, on the other hand, it is contemplated that the diamond D shall have certain predetermined deviation angles, for example, angles having magnitudes of (A''), (B'') and ($\phi''$) in the final mount, then such magnitudes are arithmetically incorporated with the deviation angles (A'), (B') and ($\phi'$) and set into the (A), (B) and ($\phi$) scales respectively.

The goniometer instrument 62 has associated therewith a third fixture 80 which is similar to the fixture 44 and which is similarly mounted on a rail 82 and shiftable longitudinally thereon. The fixture 80 carries in its upper regions a fixture block 84 which may be identical with the block 38 and which is similarly mounted in a V-rest 86. The block 84 is formed with a central bore 88 for reception therein of a second or transfer dop 90 in the form of a solid cylindrical body which may have a configuration similar to that of the dop 32 and which is formed with a longitudinally extending V-shaped groove or flute 92 designed for cooperation with the conical end 94 of an anchoring screw 96 threadedly received in the block 84 whereby the transfer dop 90 may be secured in any desired longitudinal position in the V-rest 86 fiducially referenced to the temporary dop 32 contained in the goniometer fixture 60 by means of the flute 92 and anchoring screw 96. The top is preferably formed of a heat resistant material of a refractory nature inasmuch as it is designed for use in connection with a subsequent casting operation as will be described presently.

The fixture 80 is mounted on the goniometer rail 82 in such a manner that the axis of the temporary dop 32 in the goniometer instrument 62 and the axis of the transfer dop 90 may be aligned and their opposed or adjacent ends brought into positions of close proximity so that the diamond D, carried in the hardened daub of shellac 31 on the end of the dop 32 may be transferred to the adjacent end of the dop 90 by a novel manual operation which constitutes one of the principal features of the present method, the transfer taking place without losing sight, so to speak, of the positions of the crystallographic axes of the diamond. Normally, the transfer will take place with the axes of the dops 32 and 90 extending in coincidence. However, in certain instances where, for example, a useful point on the diamond, or an edge, is offset from the longitudinal axis of the temporary dop 32, or when it lies on such axis and it is desired that in the finished mount it shall be offset from the axis of the mount, or in any other instance where it may be found desirable to effect lateral or vertical components of diamond-shift during transfer operations, means are provided whereby such offset transfer operations may be effected. Accordingly, the fixture 80 is formed in two sections, namely a composite upper section 100 and a lower section 102, the upper section carrying a V-rest 86 and the lower section being slidable on the goniometer rail 82. The upper section 100 is supported on the lower section and is slidable along an incline thereon, it being guided in such sliding movements by a cooperating dovetail tongue and groove arrangement 104. The arrangement of the tongue and groove is such that for each increment of longitudinal movement of the block 100 on the block 102, a small increment of vertical displacement of the block 100 will be effected. In this manner, the elevation of the transfer dop 90 may be varied without disturbing its orientation to bring the longitudinal axis thereof into horizontal register with the longitudinal axis of the temporary dop 32, or to move these axes out of such horizontal register.

Means are also provided whereby the axes of the dops 32 and 90 may be moved into and out of vertical register and, accordingly, the composite upper section 100 is provided with a laterally shiftable upper portion 106 with which section the V-rest 86 is integrally formed. The portion 106 is slidable on the main body of the section 100 and is guided in its lateral shifting movements by a tongue and groove arrangement 108.

Set screws 110 and 112, respectively, are associated with the two tongue and groove arrangements 104 and 108 for locking the various fixture parts in any desired positions of adjustment. From the above description, it will be seen that by proper shifting of the fixture parts, relative radial displacements in any desired direction between the two dops 32 and 90 may be effected.

In order to effect the transfer operation, the fixture 80 is adjusted so that the two dops 32 and 90 are brought into juxtaposition as shown in Figs. 4 and 6 with their axes either aligned or slightly offset from each other as described above, and with the end of the dop 90 closely approaching the extreme end of the exposed diamond D. The diamond D is then affixed to the adjacent end of the dop 90 by the application to the dop of a daub of a suitable refractory cement 114 which, upon further advancement of the dop 90 toward the dop 32 will cause the exposed end of the stone to be embedded in the cement 114. The application of the cement is made as described above without disturbing the setting of the diamond in the orange shellac 31 on the dop 32.

As best seen in Fig. 6, hardening of the refractory cement 114 is facilitated by the application to the transfer zone or region of a moderate degree of heat. This heat may be supplied by the manual application to the outer end regions of the dop 90 of a gas flame such as has been shown at 116 and issuing from a suitable torch 118. The heat generated in the transfer zone may be relied upon to soften the shellac daub 31, or, if desired, the flame 116 may be lightly passed over the daub to melt the same and thus release the diamond from the dop 31 which serves no further useful purpose in the process but which may be reused in connection with subsequent diamond mounting operations.

The transfer dop 90 is now removed from the fixture 80, together with the diamond which is affixed thereto with its useful end embedded in the hardened cement 114. The next step in the process of mounting the diamond D in a final holder or slug is the performance of a second transfer operation wherein the diamond has cast thereon such a slug or wherein a preformed slug is appropriately affixed to the diamond, utilizing fiducial referencing means similar to those which have been thus far utilized in the process so that the once transferred orientation of the stone will again be accurately transferred to the final mount.

In certain instances, as an alternative step in the process, when a particular diamond is not to be mounted bodily in a single mount but is to be sawed into individual pieces, for individual operative mounting of the various pieces on individual dops, or where a non-useful appendage is to be removed from an otherwise useful stone, sawing operations on the diamond while it still remains affixed to the dop 90 may be resorted to. In such instances, however, the dop 90, instead of being formed of a refractory material, may be constructed of a metal such as brass and, since its orientation on the dop 90 is known, orientation of the collet or other tool holder in which the dop 90 may be placed for such sawing operations to bring the diamond into register with the saw blade for most effective sawing operations, for example, the sawing thereof parallel to a crystallographic axis in the cube or (100) plane of the stone, is merely a matter of referencing the collet or holder against the fiducial indicia of the dop 90.

The means whereby the diamond D may be permanently affixed in a slug or mount such as the cylindrical metal slug 120 shown in Fig. 9 has been disclosed in Figs. 7 and 8 wherein there is disclosed a tubular cylindrical mold 121 open at both ends and having an internal diameter approximately equal to the diameter of the transfer dop 90. The mold, in use, is adapted to assume the upright position in which it is shown in Fig. 9. The casting operation is performed by inserting the diamond-carrying end of the dop 90 into the mold 121 through the lower open end thereof and pushing the inserted end of the dop well up into the medial regions of the mold. The outer cylindrical surface of the dop 90, being of the same diameter as the internal diameter of the mold 120, will fit snugly against the mold cavity wall. The upper end of the dop 90 will thus constitute, in effect, a bottom wall for the mold cavity and the diamond D affixed thereto with its useful end embedded in the refractory cement material 114 will have its other end exposed to the mold cavity. The dop 90 is referenced within the mold cavity by means of an index pin 122 having a conical end 124 extending into the fiducial groove 92 provided in the dop 90.

Actual casing operations are obtained by pouring molten metal into the mold cavity through the upper open end of the mold 121 and the cavity is filled to the desired level. Such pouring operation causes the exposed end of the diamond D to become embedded in the molten metal while such metal is excluded from contact with the useful end of the diamond which is protected from contact with the metal by the refractory cement 114. An index pin 126 having a conical end 128 extends through the wall of the mold 121 and affords a conical socket 130 in the cast metal slug 120. After the metal of the slug 120 has hardened, the pins 126 and 122 are withdrawn from the mold 120 and the dop 90 pulled from the mold cavity, at which time the refractory cement 114 will disintegrate or otherwise break away or crumble. The completed diamond tool or mount 132, with the diamond accurately referenced with respect to the conical socket 130 and to the longitudinal axis of the slug, may then be removed from the mold cavity.

The diamond mount or tool 120 thus produced is a complete article of manufacture capable of many uses. It may be shaped in various ways, for example, it can be put in a holder or tang for the radiusing or faceting of the diamond, or for the application of tables, relief angles, cutting edges and the like, the holder, of course, being properly reference relative to the conical hole 126 in the slug 132 so that the orientation which has been preserved throughout the process as previously described will similarly be preserved when the slug is itself mounted in the holder. After the diamond has been worked or shaped to the desired configuration, the slug may then be mounted in a metal shank or other preshaped tool which has been preformed with a cylindrical hole into which the slug may be inserted and secured therein by means of a set screw or by the flowing of silver solder to effect the union. A fiducial reference hole may be drilled in the shank to intersect the slug-receiving hole and a solder pin employed as a temporary anchor pin for cooperation with the conical hole 126. Upon the application of heat to the assembly, the solder pin will become melted and the solder will flow to effect a permanent union during the life of the tool.

In Fig. 11 an exemplary mount for the diamond-carrying slug 120 has been illustrated. A more or less conventional tool shank has been designated in its entirety at 150 and is provided with an undercut sloping forward end 151. For the particular use to which the tool shank is to be put it may be desired that the slug assume a predetermined angular position with respect to the axis of the shank and, accordingly, a cylindrical socket 152 is drilled into the shank body at a commensurate angle, the diameter of the socket being substantially equal to the diameter of the slug and the depth of the socket being such that when the slug is inserted into the socket the extreme end of the slug and its embedded diamond D will be exposed exteriorly of the shank body. A fiducial reference bore 154 intersects the socket 152 and is adapted to be aligned with the conical socket 130 in the slug 120 and a silver solder pin 156 or other eutectic alloy reference pin having a conical end 158 inserted into the bore 154 and socket 130 to properly orient the slug within the socket 152. Thereafter, by the application of heat to the working end of the shank 150, the solder pin may be melted in its enviroment and the molten solder will flow by capillary action into the interstices existing between the opposed surfaces of the slug 120 and socket 152 so that upon solidification of the solder, the slug will be firmly anchored in position with the crystallographic axes of the diamond bearing the desired directional relation to the axis and faces of the shank body. It will be understood that other anchoring and positioning means for the slug in the mount may be employed as, for example, the use of a suitable set screw or the like having register with the conical socket 130.

It should be understood that the principles of the present invention are applicable to other transfer or mounting methods for positioning the diamond D in a slug such as the slug 120 illustrated and described herein. The invention contemplates that the mold 121 may be utilized for shaping the slug from powdered metals by a pressing operation, utilizing a suitable operating plunger or the like. If desired, the slug may be formed in the mold 121 by the infiltration of powdered metal with molten metal. Additionally, it is contemplated that the diamond D may be transferred from the transfer dop 90 to a preformed holder within the mold 120 by metal bonding or the like. Irrespective, however, of the particular casting transfer or mounting process employed, the essential features of the present method whereby the slug or mount will emerge from the mold with the diamond mounted thereon and fiducially referenced in its orientation as described above, are at all times preserved.

From the above description it will be seen that the present method lends itself to many economics in the large scale production of diamond tools which have hitherto been unavailable where conventional mounting procedures are concerned. The economy involved in the selection of stones for mounting purposes as outlined above; the time which may be saved by serially correlating a number of selected stones, for example, a day's production thereof, with the individual transfer media and with the cassettes and films contained therein, thus making simultaneous or batch developing operations possible instead of the usual successive film processing; the use of a rapid-change cassette fixture involving the spring clips 22; the use of a single flame-producing torch or the like and the single manual operation involved in causing the flame to traverse the refractory cement 114 and set the same and to traverse the hardened shellac daub 31 and melt the same and release the diamond from the temporary dop; the adaptability of the process to the talents of tool makers possessing but moderate skill and experience while at the same time insuring the production of diamond tools containing accurately mounted stones; and the elimination of the many manual diamond-handling operations attendant upon conventional processes and the consequent likelihood of damage to the stone, are some of the more important time-saving features of the present invention.

It will be understood that throughout this specification many of the terms employed herein are employed in a broad sense which may be slightly at variance with dictionary definitions but which, considered in their broad sense are not inconsistent therewith. For example, the holders 32 and 90 which at certain stages in the mounting procedure serve to retain the diamond in roughly and precisely oriented positions respectively by means of a suitable adhesive, are described herein as having the diamond partially embedded therein. The terms "holder" or "dop," when used in this sense in connection with the term "embedded" should be extended to include the adhesive masses which retain the diamond. In such instances, the holder or dop includes not only the metallic or refraction holder bodies, but also the shellac or cementitious masses 31 and 114 associated with these bodies. It should also be understood that the present method and the apparatus illustrated herein are applicable to the mounting of stones other than diamonds having crystallographic axes which are to be oriented relative to the fiducial axes of a holder.

Throughout this specification and in the claims it is intended that where the term "parallel to" is employed, for example, where a crystallographic axis of the diamond is recited as extending parallel to a reference axis, or where two reference axes are recited as extending parallel to each other, the fact that the two axes involved are in coincidence shall not nullify the reference that they extend in parallelism. Additionally, where the terms "embed" or "embedded" are employed herein, for example, where the diamond is recited as being embedded in either the temporary or the transfer dop, it will be understood that such embedment exists by virtue of the thermoplastic adhesive or of the thermosetting adhesive by means of which the diamond is applied to these dops, the adhesive substance itself constituting portion, or elements, of the dops.

In compliance with Title 35, U.S. Code, Section 22, a preferred embodiment of the method comprising the present invention has been described herein and the apparatus employed for carrying out the method illustrated in the accompanying drawings. It should be understood, however, that the invention is not to be limited to the precise steps set forth in the specification or to the exact apparatus described for practicing the method since numerous variations thereof are contemplated within the spirit of the invention.

Having thus described the invention what I claim as new and desire to secure by Letters Patent is:

1. The method of mounting a loose diamond on a holder having fiducial reference indicia thereon establishing fiducial reference axes for the holder with the three principal crystallographic axes of the diamond bearing respective predetermined angular relationships with respect to said reference axes, and with one region of the diamond exposed and another region thereof embedded in the holder, said method comprising fixedly mounting the diamond on one end of a temporary positioning dop having fiducial reference indicia which, in combination with the longitudinal axis of the dop, establishes three fiducial reference axes for the dop, by causing said one region of the diamond to be adhered to said one end of the dop by a first adhesive, directing a beam of X-rays onto said other region of the diamond on the temporary dop and obtaining a crystal diffraction pattern of the diamond, ascertaining from said crystal diffraction pattern the angular deviation of said crystallographic axes of the diamond from said fiducial reference axes respectively of the temporary dop, bringing the holder into juxtaposition with said other region of the diamond on the temporary dop with the fiducial reference axes of the holder displaced angularly from the respective fiducial reference axes of the temporary dop by amounts equal to the ascertained deviations of axes, causing said other region of the diamond to be adhered to said holder by a second adhesive, and finally loosening said first adhesive to release the diamond from said temporary dop.

2. The method of mounting a loose diamond on a holder as set forth in claim 1 wherein the first adhesive is in the form of a hardened plastic material having a relatively low melting point and wherein the step of loosening said first adhesive involves the application to the same of sufficient heat to effect melting thereof.

3. The method of mounting a loose diamond on a holder as set forth in claim 1 wherein the first adhesive is in the form of a hardened plastic material having a relatively low melting point and wherein the second adhesive is in the form of a thermosetting cement, and wherein the setting of the second adhesive and the loosening of the first adhesive is accomplished by the manual application to said first and second adhesives of a common heat source.

4. The method of mounting a loose diamond on a holder having fiducial reference indicia thereon establishing fiducial reference axes for the holder with the three principal crystallographic axes of the diamond bearing respective predetermined angular relationships with respect to said reference axes, and with one region of the diamond exposed and another region thereof embedded in the holder, said method comprising fixedly mounting the diamond on one end of a temporary positioning dop having fiducial reference indicia thereon which, in combination with the longitudinal axis of the dop, establishes three fiducial reference axes for the dop, by causing said one region of the diamond to be at least partially embedded in said dop with the other region exposed, directing a beam of X-rays onto the exposed region of the diamond on the temporary positioning dop at a predetermined angle with respect to the fiducial reference axes of the latter and obtaining a crystal diffraction pattern of the diamond, ascertaining from said crystal diffraction pattern the angular deviations of said crystallographic axes of the diamond from said fiducial reference axes respectively of the temporary dop, placing the temporary dop with the diamond thus mounted thereon in a triaxial goniometer with the diamond at the focal region of the goniometer axes, adjusting the goniometer by setting the scales thereof at readings commensurate with said ascertained axes deviations respectively to thus bring the crystallographic axes of the diamond into coincidence with the zero axes of the goniometer, bringing the holder into juxtaposition with the exposed region of the diamond carried by the temporary dop in the goniometer with the fiducial reference axes of the holder parallel to the zero axes of the goniometer respectively, causing said exposed region of the diamond on the temporary positioning dop to be at least partially embedded in the holder while maintaining said holder and dop thus fixed relative to each other, and releasing the diamond from the temporary positioning dop.

5. The method of mounting a loose diamond on a holder as set forth in claim 4 wherein the operation of embedding the diamond in the temporary dop comprises the application to the diamond and dop of a daub of shellac, wherein the operation of embedding the diamond in the holder comprises the application to the diamond and holder of a mass of thermosetting cement, and wherein said latter embedding operation further involves the application of heat to said mass of cement whereby the ambient temperature will serve to effect said loosening operation by melting said daub of shellac.

6. The method of mounting a loose diamond in one end of an elongated metal slug having fiducial reference indicia thereon establishing a fiducial reference axis for the slug with a crystallographic axis of the diamond bearing a predetermined angular relationship with respect to said reference axis and with the working end of the diamond exposed and the inoperative end of the diamond embedded in the slug, said method comprising fixedly mounting the diamond on an end of a temporary elongated positioning dop having fiducial reference indicia thereon establishing a fiducial reference axis for the dop, with said working end of the diamond exposed and with the inoperative end thereof embedded in the dop, directing a beam of X-rays onto the exposed end of the diamond in the dop at a predetermined angle with respect to the fiducial reference axis of the latter and obtaining a crystal diffraction pattern of the diamond, ascertaining from said pattern the angular deviation of said crystallographic axis of the diamond from said fiducial reference axis of the dop, placing the dop with the diamond thus mounted thereon in a goniometer with the diamond at the focal region of the goniometer axis, adjusting the goniometer by setting the scale thereof at a reading commensurate with said ascertained axis deviation to thus bring the crystallographic axis of the diamond into coincidence with the zero axis of the goniometer, bringing one end of a refractory transfer dop having reference indicia thereon establishing a fiducial reference axis for the transfer dop into juxtaposition with the exposed region of the diamond on the temporary dop in the goniometer with the fiducial reference axis of the transfer dop parallel to the zero axis of the goniometer, causing said exposed region of the diamond on the temporary dop to be at least partially embedded in the transfer dop while maintaining said dops thus fixed relative to each other, releasing the diamond from the temporary dop, inserting said end of the transfer dop with the diamond thereon into a mold cavity having a fiducial reference protuberance therein capable of establishing said fiducial reference indicia in the molded metal slug and also establishing a reference axis for the cavity, the insertion being made so that the reference axis of the slug extends parallel to the reference axis of the mold cavity, and pouring molten metal into said cavity and allowing the same to harden to embed the inoperative end of the diamond in the metal slug thus formed by the pouring and hardening operation.

7. The method of mounting a loose diamond in one end of an elongated metal slug having fiducial reference indicia thereon establishing a fiducial reference axis for the slug with a crystallographic axis of the diamond bearing a predetermined angular relationship with respect to said reference axis and with the working end of the diamond exposed and the inoperative end of the diamond embedded in the slug, said method comprising fixedly mounting the diamond on an end of a temporary elongated positioning dop having fiducial reference indicia thereon establishing a fiducial reference axis for the dop, with said working end of the diamond exposed and with the inoperative end thereof embedded in the dop, directing a beam of X-rays onto the exposed end of the diamond in the dop at a predetermined angle with respect to the fiducial reference axis of the latter and obtaining a crystal diffraction pattern of the diamond, ascertaining from said pattern the angular deviation of said crystallographic axis of the diamond from said fiducial reference axis of the dop, placing the dop with the diamond thus mounted thereon in a goniometer with the diamond at the focal region of the goniometer axis, adjusting the goniometer by setting the scale thereof at a reading commensurate with said ascertained axis deviation to thus bring the crystallographic axis of the diamond into coincidence with the zero axis of the goniometer, bringing one end of a refractory transfer dop having reference indicia thereon establishing a fiducial reference axis for the transfer dop into juxtaposition with the exposed region of the diamond on the temporary dop in the goniometer with the fiducial reference axis of the transfer dop parallel to the zero axis of the goniometer, causing said exposed region of the diamond on the temporary dop to be at least partially embedded in the transfer dop while maintaining said dops thus fixed relative to each other, releasing the diamond from the temporary dop, inserting said end of the transfer dop with the diamond thereon into a mold cavity having a fiducial reference protuberance therein capable of establishing said fiducial reference indicia in the molded metal slug and also establishing a reference axis for the cavity, the insertion being made so that the reference axis of the slug extends parallel to the reference axis of the mold cavity, filling said mold cavity with metal and causing said metal to harden into a homogenous mass to form said metal slug with the inoperative end of the diamond embedded therein.

8. The method of mounting a loose diamond in one end of an elongated metal slug having fiducial reference indicia thereon establishing a fiducial reference axis for the slug with a crystallographic axis of the diamond bearing a predetermined angular relationship with respect to said reference axis and with the working end of the diamond exposed and the inoperative end of the diamond embedded in the slug, said method comprising fixedly mounting the diamond on an end of a temporary elongated positioning dop having fiducial reference indicia thereon establishing a fiducial reference axis for the dop, with said working end of the diamond exposed and with the inoperative end thereof embedded in the dop, directing a beam of X-rays onto the exposed end of the diamond in the dop at a predetermined angle with respect to the fiducial reference axis of the latter and obtaining a crystal diffraction pattern of the diamond, ascertaining from said pattern the angular deviation of said crystallographic axis of the diamond from said fiducial reference axis of the dop, placing the dop with the diamond thus mounted thereon in a goniometer with the diamond at the focal region of the goniometer axis, adjusting the goniometer by setting the scale thereof at a reading commensurate with said ascertained axis deviation to thus bring the crystallographic axis of the diamond into coincidence with the zero axis of the goniometer, bringing one end of a refractory transfer dop having reference indicia thereon establishing a fiducial reference axis for the transfer dop into juxtaposition with the exposed region of the diamond on the temporary dop in the goniometer with the fiducial reference axis of the transfer dop parallel to the zero axis of the goniometer, causing said exposed region of the diamond on the temporary dop to be at least partially embedded in the transfer dop while maintaining said dops thus fixed relative to each other, releasing the diamond from the temporary dop, inserting said end of the transfer dop with the diamond thereon into a mold cavity having a fiducial reference protuberance therein capable of establishing said fiducial reference indicia in the molded metal slug and also establishing a reference axis for the cavity, the insertion being made so that the reference axis of the slug extends parallel to the reference axis of the mold cavity, and forming said metal slug in said cavity by the infiltration in said cavity of a powdered metal with a molten metal, thus causing the inoperative end of the diamond to be embedded in the slug.

9. The method of mounting a loose diamond in one end of an elongated metal slug having fiducial reference indicia thereon establishing a fiducial reference axis for the slug with a crystallographic axis of the diamond bearing a predetermined angular relationship with respect to said reference axis and with the working end of the diamond exposed and the inoperative end of the diamond embedded in the slug, said method comprising fixedly mounting the diamond on an end of a temporary elongated positioning dop having fiducial reference indicia thereon establishing a fiducial reference axis for the dop, with said working end of the diamond exposed and with the inoperative end thereof embedded in the dop, directing a beam of X-rays onto the exposed end of the diamond in the dop at a predetermined angle with respect to the fiducial reference axis of the latter and obtaining a crystal diffraction pattern of the diamond, ascertaining from said pattern the angular deviation of said crystallographic axis of the diamond from said fiducial reference axis of the dop, placing the dop with the diamond thus mounted thereon in a goniometer with the diamond at the focal region of the goniometer axis, adjusting the goniometer by setting the scale thereof at a reading commensurate with said ascertained axis deviation to thus bring the crystallographic axis of the diamond into coincidence with the zero axis of the goniometer, bringing one end of a refractory transfer dop having reference indicia thereon establishing a fiducial reference axis for the transfer dop into juxtaposition with the exposed region of the diamond on the temporary dop in the goniometer with the fiducial reference axis of the transfer dop parallel to the zero axis of the goniometer, causing said exposed region of the diamond on the temporary dop to be at least partially embedded in the transfer dop while maintaining said dops thus fixed relative to each other, releasing the diamond from the temporary dop, to thus transfer the diamond to said end of the transfer dop, bringing a preformed metal slug having reference indicia thereon establishing a reference axis for the slug into juxtaposition with the inoperative end of the diamond on the transfer dop, with the reference axes of the transfer dop and slug in alignment, causing said inoperative end of the diamond to be at least partially embedded in the slug, and releasing the operative end of the diamond from its embedment in the temporary dop.

10. The method of mounting a loose crystal on a holder according to claim 9 wherein the crystal is initially affixed to the first holder in a position wherein its crystallographic axes extend approximately in the general directions of the established reference axes of the first holder.

11. The method of mounting a loose crystal on a holder having fiducial reference indicia thereon establishing fiducial reference axes for the holder with the three principal crystallographic axes of the crystal bearing respective predetermined angular relationships with respect to said reference axes, said method comprising fixedly mounting the crystal on a first positioning body, said body having fiducial reference indicia thereon establishing three reference axes for the body, measuring the respective deviations of the axes of the crystal from the axes of the body, placing the body with the crystal thereon in a goniometer with the crystal at the focal region of the goniometer axis, adjusting the goniometer by setting the scale thereof at a reading commensurate with said ascertained axis deviations to thus bring the crystallographic axes of the crystal into coincidence with the zero axis of the goniometer, adjusting the goniometer by setting the scales thereof at readings commensurate with said measured axis deviations respectively, bringing a second body having fiducial reference indicia thereon establishing three reference axes for the latter body into juxtaposition with the crystal on the first body with the reference axes of the second body parallel to the zero axes respectively of the goniometer, affixing the crystal to the juxtapositioned second body, and releasing the crystal from the first body.

12. The method of mounting a loose crystal in a tool shank having fiducial reference axes with the crystal axes bearing respective predetermined relationships to said fiducial reference axes and with one region of the crystal exposed and the other region thereof disposed within the confines of the shank, said method comprising fixedly mounting the crystal on a temporary positioning dop having fiducial reference axes with said one region of the crystal exposed and with said other region thereof at least partially embedded in the dop, directing a beam of X-rays onto said one region of the crystal on the dop at predetermined angles with respect to the fiducial reference axes thereof and obtaining a crystal diffraction pattern of the crystal, ascertaining from said crystal diffraction pattern the angular deviations of said crystal axes from said fiducial reference axes respectively, bringing a transfer dop having fiducial reference axes into juxtaposition with the exposed region of the crystal on the temporary dop with the fiducial axes of the transfer dop displaced angularly from the fiducial axes of the temporary dop by respective amounts equal to the ascertained axes deviations, causing the exposed region of the crystal on the temporary dop to become at least partially embedded in the transfer dop while maintaining such axes deviations between the dops, releasing the crystal from the temporary dop to thus transfer the same to the transfer dop, inserting the transfer dop and crystal carried thereby into a metal-molding cavity having fiducial reference axes with the reference axes of the transfer dop and mold cavity respectively extending in parallelism, inserting a protuberance into said mold cavity to produce fiducial reference axes in the molded metal, casting a metal slug in said cavity partially encompassing the exposed portion of the crystal on the temporary dop, removing said slug from the mold cavity, and affixing said slug to the tool shank with the fiducial reference axes of the slug extending in parallelism with the reference axes of the shank.

References Cited in the file of this patent

UNITED STATES PATENTS

| | | |
|---|---|---|
| 740,902 | Oostendorp | Oct. 6, 1903 |
| 1,305,038 | De Vries et al. | May 27, 1919 |
| 1,766,037 | Dawson | June 24, 1930 |
| 2,151,736 | Broughton | Mar. 28, 1939 |
| 2,326,319 | Bailey | Aug. 10, 1943 |
| 2,377,862 | Bond | June 12, 1945 |
| 2,392,528 | Fankuchen | Jan. 8, 1946 |

FOREIGN PATENTS

| | | |
|---|---|---|
| 9,053 | Great Britain | July 9, 1914 |
| 167,666 | Great Britain | July 9, 1920 |
| 553,812 | Great Britain | June 7, 1943 |
| 558,192 | Great Britain | Dec. 24, 1943 |

UNITED STATES PATENT OFFICE

CERTIFICATE OF CORRECTION

Patent No. 2,896,477                                                                  July 28, 1959

Harold C. Miller

It is hereby certified that error appears in the above numbered patent requiring correction and that the said Letters Patent should read as corrected below.

In the heading to the printed specification, between the line giving the filing date and serial number of the application and the line giving the number of claims and classification, insert the following which was inadvertently omitted:

The assignee, Super-Cut Inc., hereby dedicates to
        the public the invention of said application and
        any and all letters patent to issue on the
        application.

Signed and sealed this 9th day of February 1960.

(SEAL)

Attest:

KARL H. AXLINE
Attesting Officer

ROBERT C. WATSON
                                                              Commissioner of Patents